Richard Keyes
INVENTOR.

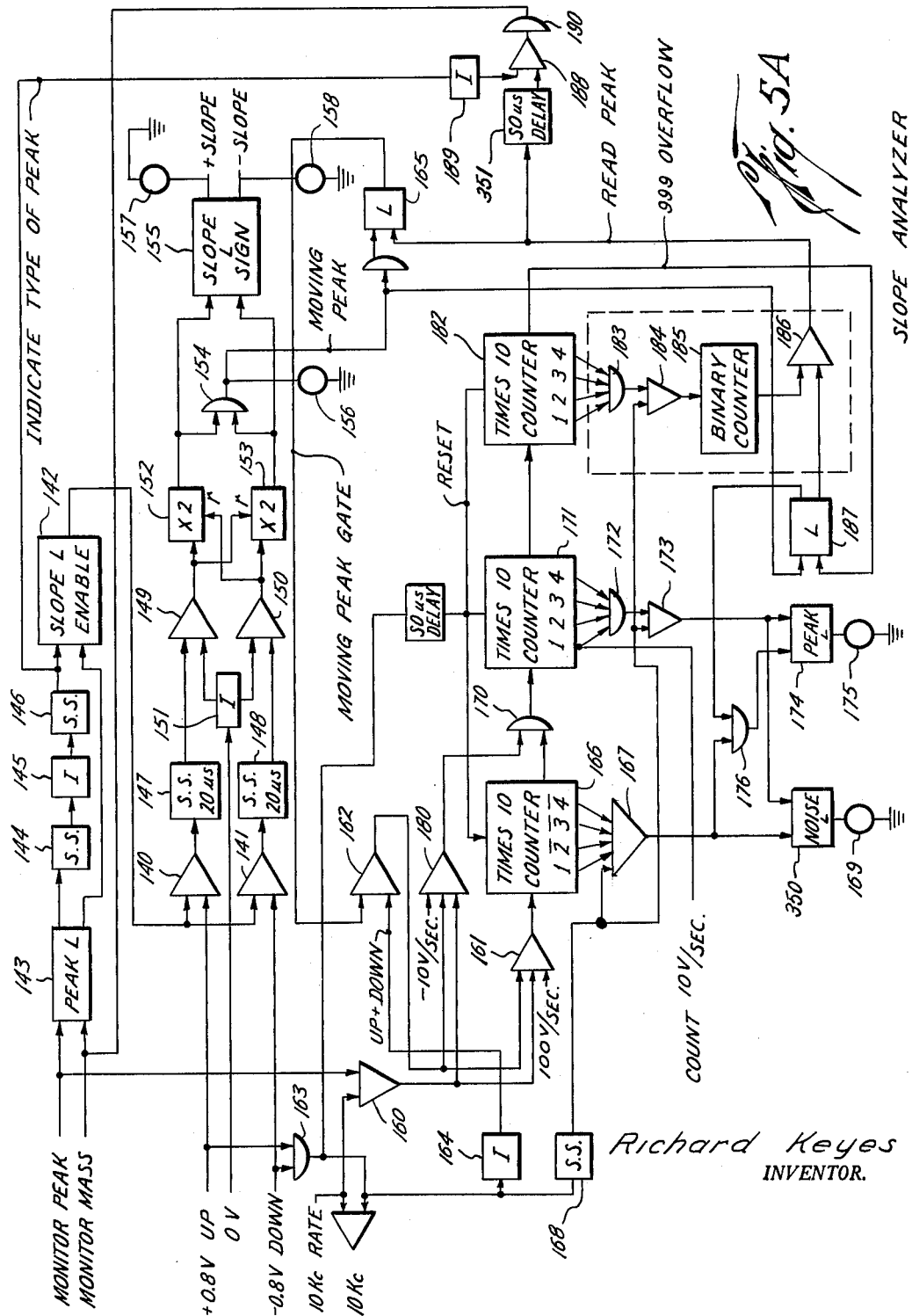

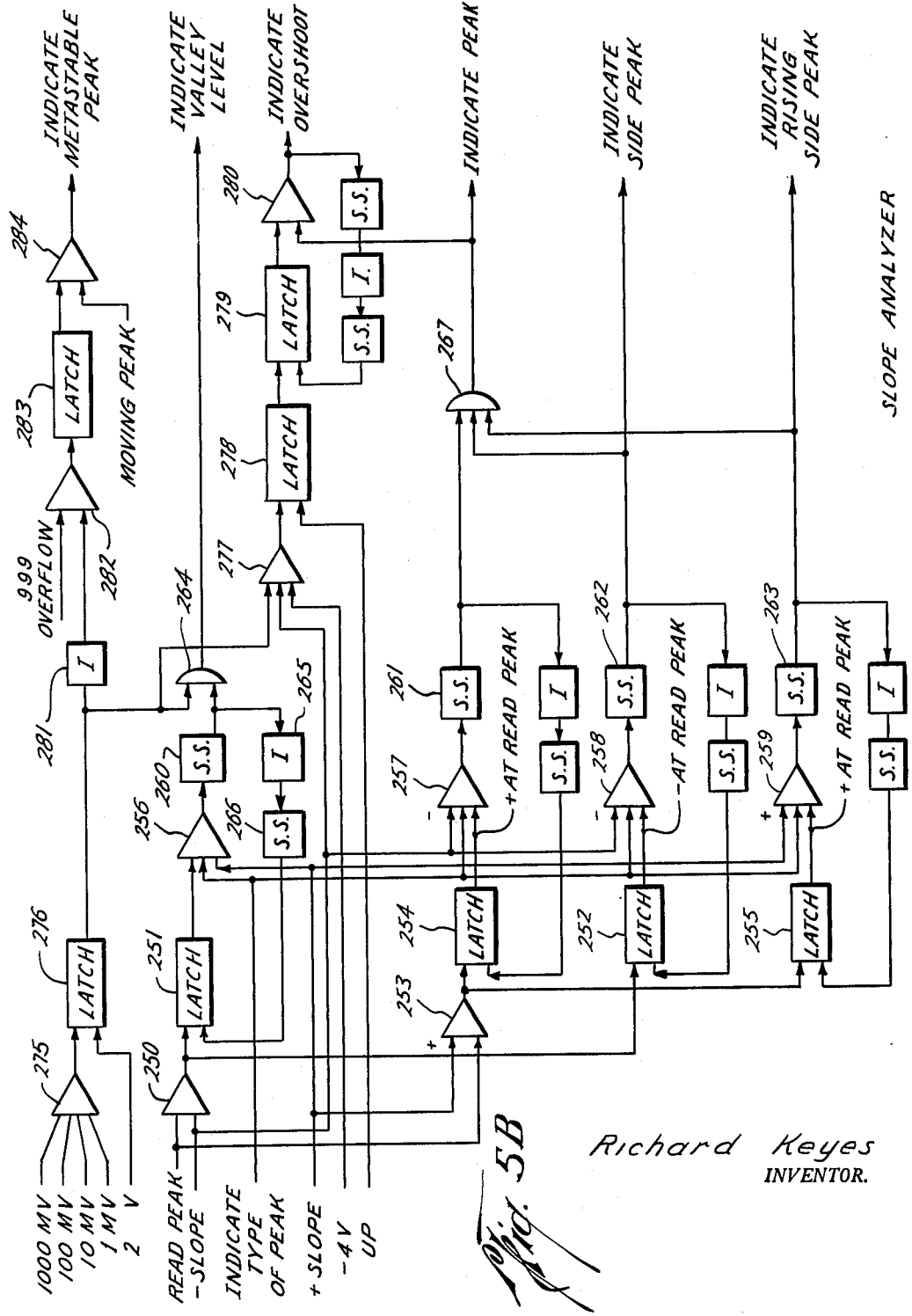

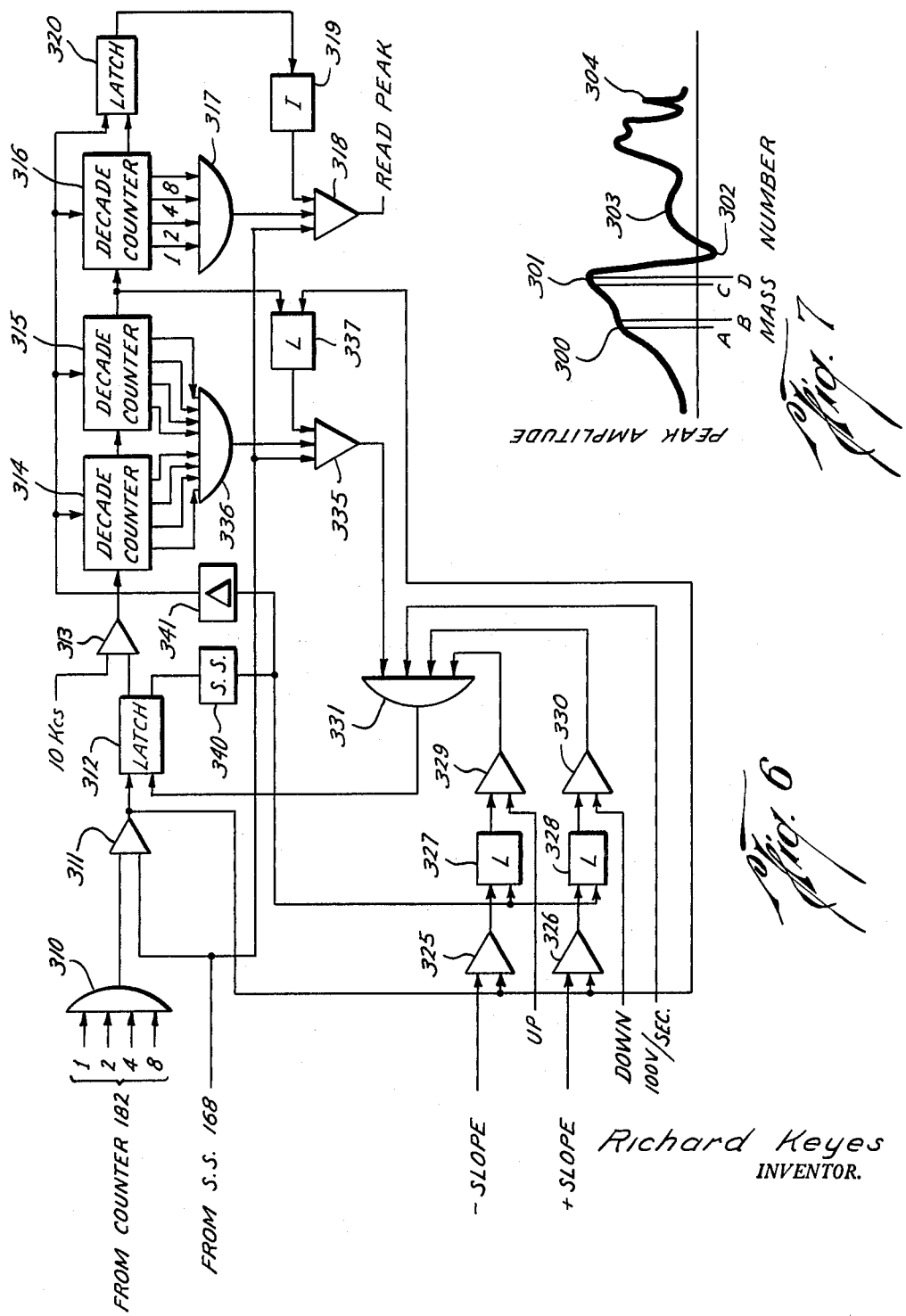

United States Patent Office 3,221,253
Patented Nov. 30, 1965

3,221,253
PEAK ANALYSIS AND DIGITAL CONVERSION APPARATUS
Richard Keyes, Bellaire, Tex., assignor to Dresser Industries, Inc., Dallas, Tex., a corporation of Texas
Filed Apr. 17, 1961, Ser. No. 103,623
18 Claims. (Cl. 324—103)

This invention relates to peak analysis of variable voltages, and more particularly to analysis of such voltages as are obtained from mass spectrometers, gas chromatographs, infrared spectrometers, and the like, to allow indication of the various types of peaks in such voltages.

Mass spectrometers, infrared spectrometers, gas chromatographs, and like instruments are frequently used both in the laboratories and in process control, for analysis of the chemical constituents of various types of materials. Such instruments customarily provide a voltage which is an instantaneous measure of the relative proportions of the various constituents of the compound or mixture which is being analyzed. In this application particular reference will be made to a mass spectrometer, but it will be understood that the invention is equally useful in connection with the other tools mentioned, and, is in fact useful in connection with the analysis of the peaks in any variable voltage.

In the mass spectrometer, either the accelerating voltage or the flux density is varied and the relative amplitude of the ion current furnishes an indication of the relative amount of the constituent corresponding to the instantaneous amplitude of the variable. It is desirable to distinguish valid peaks of ion current from "noise" peaks and also to distinguish valid peaks from so-called "metastable" peaks. Further, it is desirable to digitally indicate the relative amplitude of each valid peak and simultaneously to furnish an indication of the mass number corresponding to that particular peak. Visual inspection of the usual graphic record obtained from a mass spectrometer is quite difficult and time consuming, and it is an object of this invention to automatically perform the analysis customarily made by visual inspection.

In the past it has been suggested that peak analysis of a mass spectrometer output be accomplished through differentiation of the ion current, which of course results in detection of the slope of the ion current at any instant. In one specific prior apparatus, when the slope in the positive direction exceeds a predetermined level, the beginning of a peak is indicated and suitable counters are reset. Then, when the slope changes to a predetermined level in the negative direction, a digital conversion technique is carried out to furnish an analog voltage of amplitude equal to the "peak" voltage, whereupon a digital readout of this analog voltage is caused to occur. While this prior apparatus is automatic in operation, it in fact does not furnish a completely satisfactory solution to the problem of peak analysis, since the technique is not sufficiently sensitive for all purposes and fails to indicate the existence of certain types of peaks which are of interest to the investigator.

The present invention is designed to provide a more satisfactory peak analysis system which will accurately distinguish between valid peaks and noise, and between valid peaks and metastable peaks, and will identify the position of a valid peak extremely accurately. In the apparatus of the invention, an analog voltage is continuously compared with the peak voltage under the control of a suitable counter which periodically counts upwardly whenever the difference between the analog comparison voltage and the peak voltage is greater than a predetermined amount in the positive direction and periodically counts downwardly whenever that difference is greater than a predetermined amount in the negative direction. Then, whenever the variable peak voltage levels off so that it remains in the dead-band defined by these predetermined levels for a predetermined length of time, a valid peak is indicated and the number stored in the counter is read out as the amplitude of the peak voltage at that instant. The apparatus of the invention also provides for indication of which of the various types of peak any particular peak is, such as "side peak," "overlap peak," "valley level peak," and the like. In the event that the output of the comparison circuit remains in the dead-band for an extremely long interval of time, a metastable peak is indicated. The apparatus further provides for digital readout of the mass number at the time that a valid peak is indicated, through conversion of the accelerating voltage (if accelerating voltage is the variable) into a digital indication of mass number.

One embodiment of the invention employs a first counter which is advanced periodically during the time the difference voltage remains in the dead-band and which supplies an output to a second counter after the first counter reaches a level between predetermined limits but only when the difference voltage goes out of the dead-band. The second counter therefore counts the number of times the difference voltage remains in the dead-band for a fixed time interval and when a predetermined count is reached, the second counter causes a valid peak to be indicated.

An alternative embodiment employs the first counter to gate the periodic pulses of voltage from a clock source into a third counter when the first counter reaches a predetermined level indicating the onset of a peak. The gate is closed when the peak voltage changes slope or changes to a faster slope and the number stored in the third counter is a measure of the width of the peak. Since a valid peak has a width between known limits, only a count between such limits causes indication of a valid peak.

In the illustrative embodiments of the invention a single bi-directional counter is employed for both peak voltage and acceleration voltage "nulling" and readout and such counter is provided with bypass circuits to provide for speedier counting when the acceleration voltage is being nulled. Of course, separate counters could be used for such purposes.

The invention will now be more fully described in conjunction with attached drawings illustrating preferred embodiments thereof.

In the drawings:

FIGURES 5A and 5B are detailed block diagrams of different portions of the slope analyzer of FIGURE 1;

FIGURE 6 is a block diagram of an alternative embodiment of a portion of the apparatus of FIGURE 5A; and FIGURE 7 is an idealized showing of a possible mass spectrometer graph showing the various types of peaks which can be distinguished by the apparatus of this invention.

Figure 1:
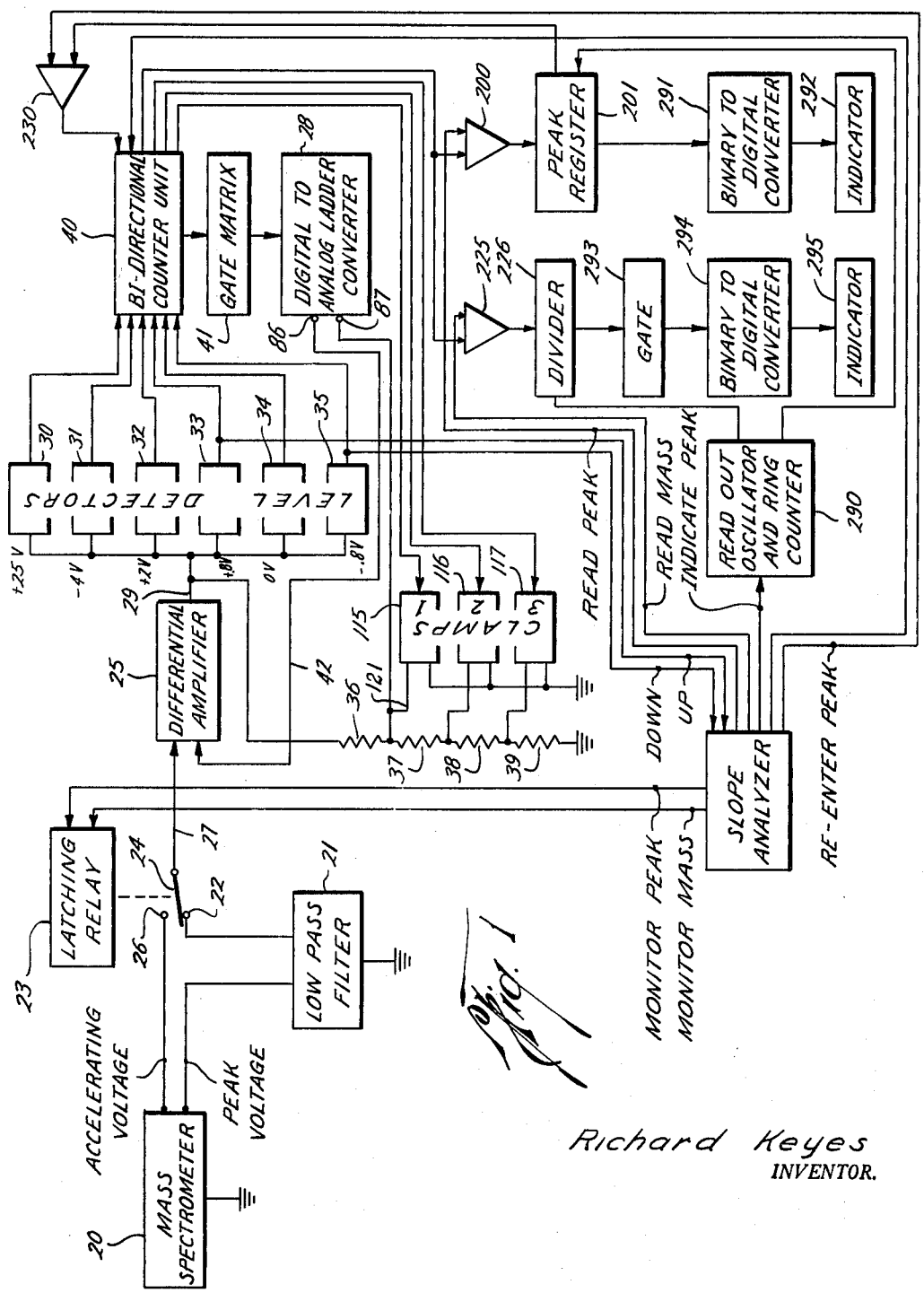
FIGURE 1 is a block diagram showing the overall combination of the invention.

Referring first to FIG. 1, as indicated above, the apparatus of the invention can be used in connection with analysis of the peak voltage and accelerating voltage from a mass spectrometer generally indicated at 20. Though the preferred embodiment of the invention will be described in conjunction with a mass spectrometer, it is also emphasized above that this apparatus can be used in conjunction with other analysis apparatus, such as a gas chromatograph or an infrared spectrometer.

The mass spectrometer may be of the conventional type in which an accelerating voltage is varied and the ion current measured to determine the relative proportion of elements of various mass numbers in the sample under analysis. The ion current yields a peak voltage which is supplied from the mass spectrometer through a low pass filter 21 to the contact 22 of a latching relay 23. The low pass filter is designed to filter out noise voltages which are above, say, 100 cycles per second. The latching relay 23 may be of a conventional type which remains in one position when directed to that position, until an energizing voltage is supplied to switch it to the opposite position. The well-known mercury-wetted relay is appropriate for this application. The relay includes a movable contact 24 which, in the position shown, engages the stationary contact 22 to connect the peak voltage to one input of a differential amplifier 25. In the other condition of the latching relay the movable contact 24 engages a stationary contact 26 to which is supplied the accelerating voltage from the mass spectrometer.

In the differential amplifier 25, the voltage supplied along line 27 from either the peak voltage or accelerating voltage output of the mass spectrometer is compared with a reference voltage derived from a digital to analog converter network 28. This network continuously builds up or down an analog voltage which is intended to equal the input voltage along line 27, so that the output of the differential amplifier may be adjusted to zero. The ungrounded output terminal of the differential amplifier is connected via line 29 to a number of level detectors 30–35. These level detectors are each designed to respond to any voltage greater than a preselected input voltage and to deliver an output voltage at that time. The level deectors may include the conventional Schmitt trigger circuits and may be set for different voltages, such as the voltages indicated in FIG. 1. In that figure, it is indicated that the level detector 30 is responsive to a voltage over plus 25 volts, the detector 31 is responsive to a voltage greater in the negative direction than minus 4 volts, the level detector 32 is responsive to a voltage greater than plus 2 volts, the level detector 33 is responsive to a voltage greater than plus 0.8 volt, the detector 34 to a voltage greater in the positive direction than 0 volt, and the detector 35 to a voltage greater in the negative direction than minus 0.8 volt. Whenever the output is greater in magnitude than these preselected levels, the appropriate level detectors develop suitable actuating voltages.

The ungrounded output line 29 is also connected to ground through a series of resistors 36–39 whose purposes will be discussed hereinafter. The outputs of the level detectors are supplied to a bi-directional counter unit 40 which counts to a digital level under the control of the various level detectors such as to supply outputs through a gate matrix 41 to the ladder converter 28. The gates from the gate matrix control the ladder converter in such fashion as to deliver an appropriate output voltage from the converter to the differential amplifier along line 42.

Figure 2:
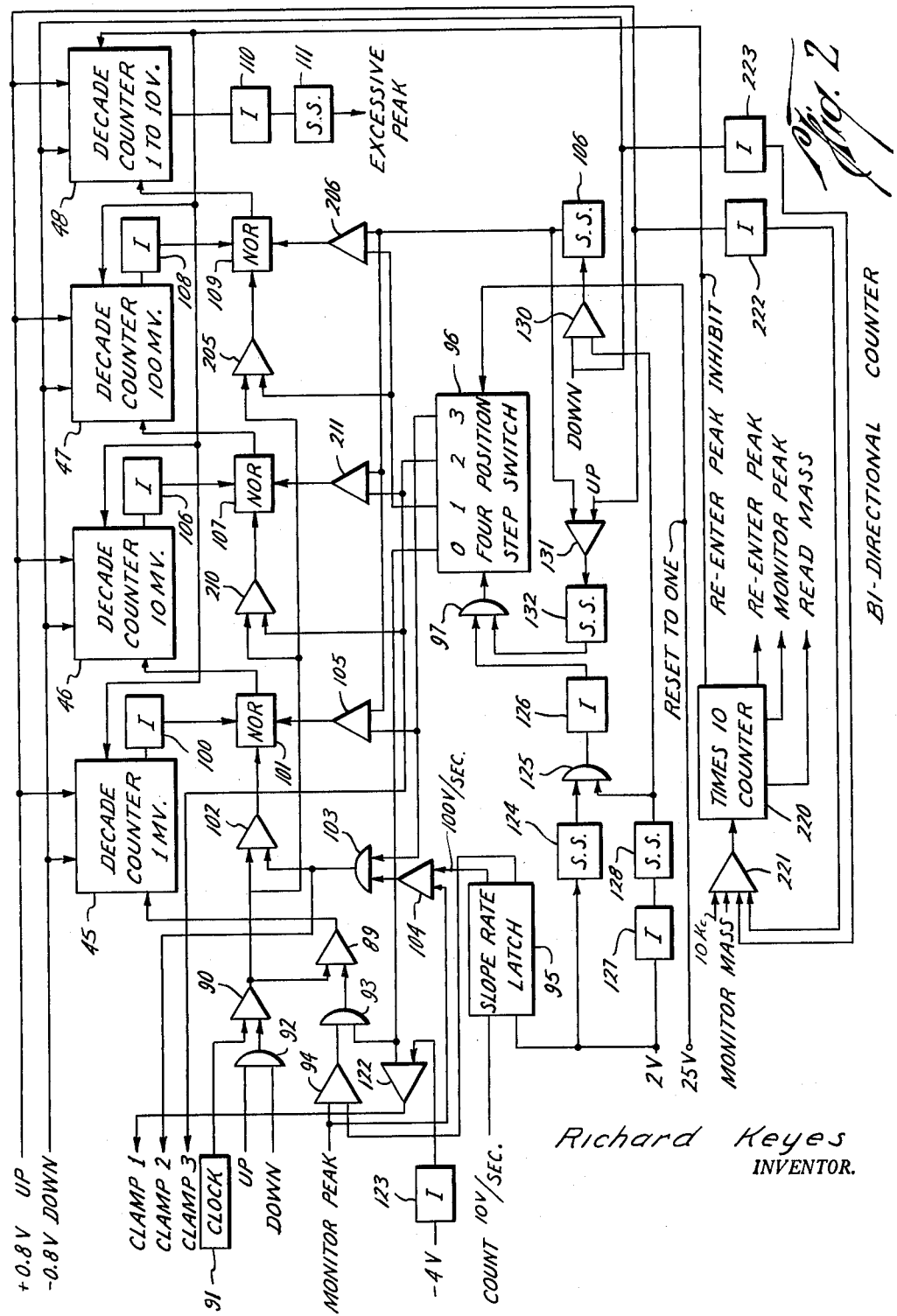
FIGURE 2 is a block diagram showing the bi-directional counter and a portion of the slope analyzer of FIGURE 1 in greater detail.

Referring to FIG. 2, the bi-directional counter 40 will now be described in greater detail. In that figure, the actuating voltage from the plus 0.8 volt level detector is identified as the UP gate, and the actuating voltage from the minus 0.8 volt level detector 35 is identified as the DOWN gate. These two gates are supplied to each of a plurality of decade counters 45 through 48. The decade counters are of the conventional bi-directional type which supply eight separate gate outputs, these being the 1, $\bar{1}$, 2, $\bar{2}$, 4, $\bar{4}$ and 8, $\bar{8}$ gates.

Figure 3:
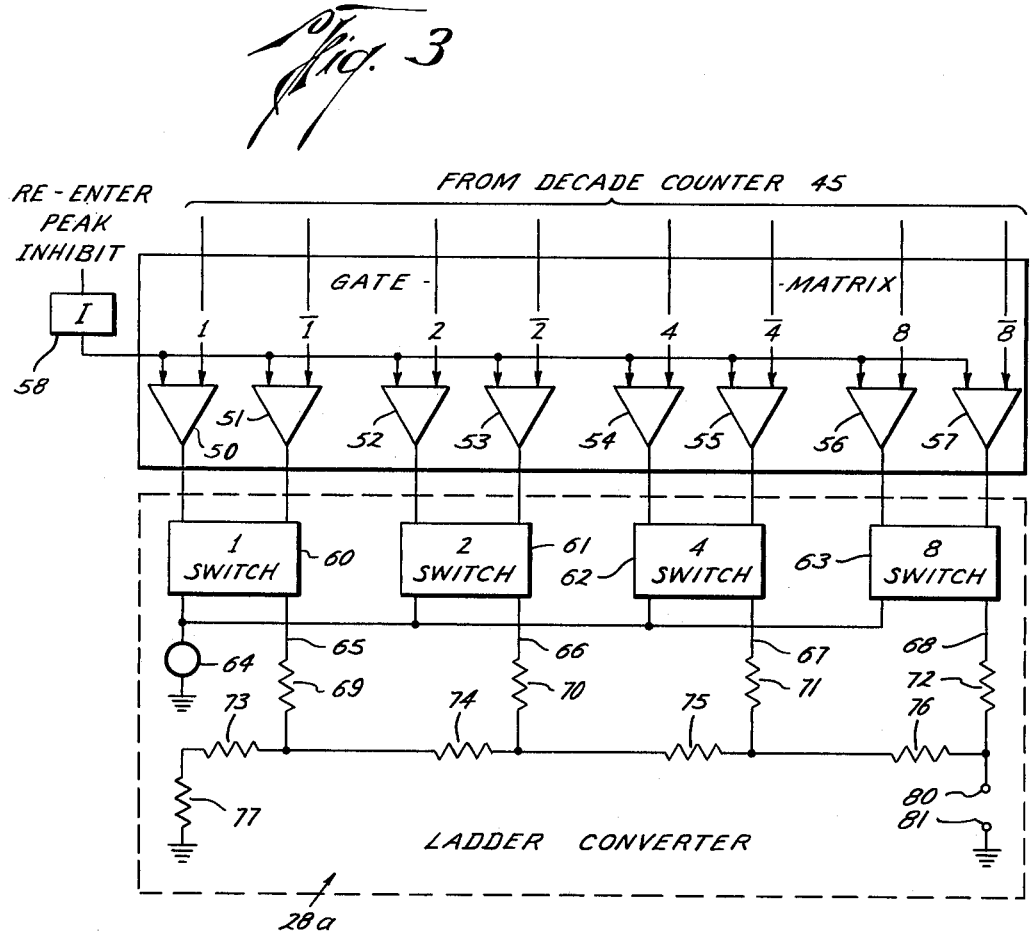
FIGURE 3 is a partially schematic block diagram showing a portion of the gate matrix and digital to analog converter of FIGURE 1 in detail.

Referring to FIG. 3, showing the gate matrix and ladder converter associated with decade counter 45, the various gates from the decade counter are directed to a series of logical AND's 50–57. The other inputs to these AND's are obtained from an inverter 58 to which is supplied a so-called RE-ENTER PEAK INHIBIT gate. The function of this gate will be described hereinafter, but suffice it to say at this time that during the major portion of operation of the apparatus, the gate is not up, so that an input is available from the inverter 58 at each of the AND's 50–57.

The outputs of AND's 50 and 51 are connected to a "1" switch 60, the outputs of AND's 52 and 53 are connected to a "2" switch 61, the output of AND's 54 and 55 are connected to a "4" switch 62, and the outputs of AND's 56 and 57 are connected to a "8" switch 63. Switches 60–63 are of a conventional flip-flop type designed to control the section 28a of ladder converter 28. Each of the switches is connected to one side of a voltage source 64, the other side of which is grounded. The "1" switch 60 is also connected to a line 65, the switch 61 is connected to a line 66, the switch 62 is connected to a line 67, and the switch 63 is connected to a line 68. The lines 65–68 are respectively connected to resistors 69–72. The resistor 69 is connected to the junction between resistors 73 and 74, the resistor 70 is connected to a junction between resistors 74 and 75, resistor 71 is connected to a junction between resistors 75 and 76, and resistor 72 is connected to the other side of resistor 76. The other side of resistor 73 is connected through resistor 77 to ground.

The lines 65–68 are connected by the respective switches 60 through 63 either to ground or to the ungrounded side of the voltage source 64, depending upon the conditions of the respective switches. The output voltage from the ladder converter is available between ground and the junction between resistors 72 and 76, at output terminal 80.

This type of ladder converter is disclosed in my co-pending application Serial No. 56,023, filed September 14, 1960, on Digital to Analog Converter. As explained in that application, when the "1" switch 60 is in its "0" condition, the line 65 is connected to ground. When the "1" switch 60 is in its "1" condition, the line 65 is connected to the source 64. The switches 61–63 operate in the same manner.

In operation of the ladder converter and gate matrix, when the decade counter 45 is in its "0" condition indicating "0" count, the $\bar{1}$, $\bar{2}$, $\bar{4}$, and $\bar{8}$ gates are all up, and the switches 60–63 are all in their "0" conditions, so that lines 65–68 are connected to ground and the output of the network is "0" volt. When the counter advances to its "1" condition, the "$\bar{1}$" gate goes down and the "1" gate comes up, so that switch 60 connects line 65 to source 64 and an appropriate level of voltage corresponding to the "1" condition is available between output terminal 80 and ground terminal 81. As indicated in FIG. 2, the decade counter 45 supplies voltage outputs which may have the units relationship to the outputs controlled by counter 46. For instance, as indicated in the figure, the decade counter 45 may control voltages in the 1 to 9 millivolt range, while counter 46 may control voltages in the 10 to 90 millivolt range. Therefore, with switch 60 in its "1" condition, a voltage output of 1 millivolt would be available between terminals 80 and 81.

When the counter 45 advances to its "2" condition, gate 2 comes up, while gate 1 goes down and gate $\bar{1}$ comes up. The switch 61 therefore connects line 66 with the source 64, while the lines 65, 67 and 68 are connected to ground. There is then available between terminals 80 and 81 a voltage of 2 millivolts. The operation of the counter, matrix and converter in the remaining portion of the decade will be evident from the above description.

The counters 46–48 of FIG. 2 are similarly connected to gate matrices and ladder converters 28b–28d in order to develop the voltages appropriate to their operation in the system. The counter 45, as indicated, may develop voltages in the units relationship to those developed under the control of counter 46 which are in the tens relationship, while counter 47 may control voltages in the hundreds relationship and counter 48 may control voltages in the thousands relationship. My said application Serial No. 56,023 also discloses an appropriate arrangement for the connection of a plurality of digital to analog voltage networks of the type shown in FIG. 3 in order to derive a single output voltage under the control of several decade counters.

Figure 4:
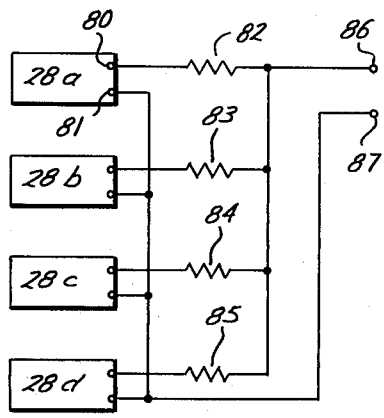
FIGURE 4 is a schematic diagram showing the connections of the several converter networks of the digital to analog converter.

FIG. 4 contains a schematic showing of such an arrangement, with ladder networks 28a–28d respectively connected to output terminal 86 through resistors 82–85, and with the other terminals of the ladder networks connected together to output terminal 87.

Referring now to FIG. 2, the counter 45 is cycled under control of the output of a logical AND 89. One of the inputs of the AND 89 is supplied from another logical AND 90 to which is connected a clock voltage from a source 91. That source supplies cyclic pulses of voltage repeated at an appropriate frequency, such as 10 kilocycles per second, so that the interval between pulses is 0.1 millisecond. The other input to AND 90 is supplied from a logical OR 92 to which is supplied both of the UP and DOWN gates. Therefore, when either of the plus 0.8 volt or minus 0.8 volt actuating voltage is available, an output is supplied to one input of AND 89 each time that a 10 kc. pulse is developed by the clock oscillator.

The other input to AND 89 is obtained from the output of a logical OR 93. The OR 93 obtains one input from a logical AND 94 to which a MONITOR PEAK gate is supplied. The generation of this gate will be described hereinafter, but suffice it to say at this point that the MONITOR PEAK gate is up whenever the peak voltage is connected by latching relay 23 (FIG. 1) to input line 27 of the differential amplifier. The other input to logical AND 94 is obtained from a slope rate latch 95 which is of the usual flip-flop type. One input to the slope rate latch is a COUNT 10 VOLTS PER SECOND gate, and, when that gate is up, a voltage is available from the slope rate latch at the input to AND 94.

The other input to logical OR 93 is supplied from the "0" output of a cyclic four position step switch 96. This switch is of a conventional type which is capable of supplying a signal voltage, such as plus 10 volts to any one of its output lines "0," "1," "2," "3." The switch is cycled through the conditions "0" to "3" on a control of an appropriate input voltage supplied by a logical OR 97, and, when it is in its third step position, the next gate from OR 97 will cause it to return to its "0" condition for stepping through another cycle. When the step switch 96 is in its "0" condition, it "0" line output is supplied with signal voltage, while the other lines are grounded.

For convenience sake, the "1" condition of the various logical circuits in this application will be described as plus 10 volts while the "0" state will be described as ground. It will be evident, however, that any other appropriate voltage could be used and specifically that a negative voltage could represent the "1" state of the logical circuitry, rather than a positive voltage.

When the step switch 96 is in its "0" condition, as it usually is when the peak voltage from the mass spectrometer is being monitored, plus 10 volts is available at the logical OR 93.

With the apparatus so far described in the bi-directional counter, when the slope rate latch is in its count 10 volts per second condition, and the MONITOR PEAK gate is up, or when the stepper 96 is in its "0" condition, one input is available at AND 89. Then, when either of the UP and DOWN gates indicating a differential amplifier voltage output of greater than plus 0.8 volt or minus 0.8 volt, is up, the AND 89 is supplied with its second input each time that a 10 kcs. pulse is available from the clock oscillator. Therefore, under these conditions, the decade counter 45 is advanced by each 10 kcs. pulse. The counter consequently develops an output voltage from the ladder converter 28 which steps from 0 millivolt to 9 millivolts, with advance of the counter. The output of the last binary stage of the counter 45 is connected through an inverter 100 to a logical NOR 101. Another input to this NOR 101 is supplied from a logical AND 102 to which the output of AND 90 is supplied. The second input to AND 102 is derived from a logical OR 103. One input to this OR 103 is from the "3" output of the step switch 96, while the other input is derived from a logical AND 104. The AND 104 received the 100 VOLTS PER SECOND gate from the slope rate latch 95, and also the MONITOR PEAK gate. Assuming for the moment that the slope rate latch is in its 10 volts per second condition, there will be no output from AND 104, and assuming that the step switch is in its "0" condition, there will be no output from OR 103, so that there will be no output from AND 102.

The third input to NOR 101 is obtained from a logical AND 105 which is supplied with inputs from the third line of the step switch 96 and from the output of a single shot multivibrator, or univibrator 106. The function of the AND 105 and its output will be described hereinafter, but it is assumed at this time that there is no output from that AND.

Since the flip-flop circuits which are conventionally used in the counters, latches, and the like trigger only on the trailing edges of gates or pulses, there will be no output from NOR 101 until an input to the NOR falls from plus 10 volts condition to ground. Such a condition obtains when the decade counter 45 advances from its 9 to its 0 condition. Then, the output voltage of the last binary stage of the counter goes from "0" volt to plus 10 volts, which is inverted by inverter 100, so that the corresponding input to NOR 101 goes from plus 10 volts to ground. The output of NOR 101 is supplied to the input of decade counter 46, so that, when the decade counter 45 changes from its "9" to its "0" condition, indicating a count of 10, the decade counter 46 is advanced to its "1" condition.

The output of decade counter 46 is similarly connected through an inverter 106 to a NOR 107 whose output is connected to the input of the decade counter 47, and the output of counter 47 is connected through an inverter 108 to a NOR 109 whose output is connected to the input of decade counter 48.

As a result of these connections, the counters operate in sequential fashion to develop counts from "0" to "9,999," and the counters in turn control their associated gate matrices ladder converters to develop corresponding voltages from "0" millivolt to 9.999 volts.

The particular design of apparatus disclosed herein is intended to accept a peak voltage of no more than 9.999 volts and may be provided with suitable attenuators to accept an acceleration voltage input of 10–100 volts. Any voltage greater than these levels will exceed the capacity of the bi-directional counters, and a gate indicative of each excess is obtained from the output of counter 48 through inverter 110 and single shot 111.

It was indicated above that the slope rate latch 95 is normally in the count 10 volts per second condition, but when the 2 volts level detector 32 delivers an output indicating that the differential amplifier output is greater than plus 2 volts, the slope rate latch is changed to its 100 volts per second condition. At that time, the 100 VOLTS PER SECOND gate comes up, and, with the MONITOR PEAK gate up, there is an output from logical AND 104. There is therefore an output from OR 103 into AND 102. Since the UP gate will be up at this time, an output will be developed from AND 102 at the time of each 10 kcs. pulse. This output, as indicated above, is supplied to NOR 101, and each time the output of AND 102 falls from plus 10 volts to ground, at the end of the 10 kcs.

pulse, there will be an input to the first stage of decade counter 46. Therefore, the decade counter 45 is bypassed, when the slope rate latch delivers a 100 VOLTS PER SECOND gate. Counting therefore proceeds at a 10 millivolt rate for each 10 kcs. pulse, this being equivalent to 100 volts per second. Of course, such counting only proceeds as long as the UP or DOWN gate is up. If the UP gate is up counting proceeds to increase the voltage from the output of the digital to analog converter 28.

In the particular embodiment herein illustrated, the gain of differential amplifier 25 is of the order of 1,000, but the output of the differential amplifier is developed across resistors 36–38 to which are connected clamps 115–117. These clamps are normally not operative, but when they are operated, the connections between the clamps and the resistor network are grounded. The resistors 36–39 preferably have relative magnitudes such that when the first clamp 115 is operated, the overall gain of the amplifier and resistor combination is at a maximum, but when none of the clamps is operated, the overall gain of the amplifier is at a minimum, say 1. In effect, the network controls the amount of feedback of the output voltage of the differential amplifier to the input of the amplifier. It will be seen that the line 42 connected to the input of the differential amplifier is connected to output terminal 86 of the ladder converter. The output voltage of the ladder converter is developed between this terminal and terminal 87 which is connected to the junction between resistors 36 and 37. As indicated above, when the clamp 115 is operated, the terminal 121 will be grounded so that feedback will be zero and only the voltage output of the analog converter will be connected to line 42. However, when clamp 115 is opened, clamps 116 and 117 also being open at this time, the entire voltage available across resistors 37 through 39 is fed back in series with the converter voltage, so that the gain may be of the order of "1."

Referring back to FIG. 2, the clamp 115 is operated when the step switch 96 is in its "0" position and the output voltage from the amplifier is not greater than 4 volts in the negative direction. The "0" output of the step switch is connected to one input of a logical AND 122 which is also connected to the output of level detector 31 through an inverter 123. Thereby, whenever the voltage is not greater than —4 volts, and the step switch is in its normal "0" condition, the feedback is at a minimum and the gain of the differential amplifier is at its maximum.

When, however, the level detector 32 (FIG. 1) is operated, indicating that the output of the differential amplifier is greater than pulse 2 volts, then a gate is available at the slope rate latch 95 to switch it to provide a 100 VOLTS PER SECOND gate. It has already been indicated above that this gate causes the bypass of the decade counter 45 and the operation of decade counter 46 to cyclically switch in 10 millivolts for each 10 kcs. pulse, but in addition, the formation of the 100 VOLTS PER SECOND gate is accompanied by the stepping of the step switch from its normal "0" position to its "1" position. This is accomplished through connection of the output of the level detector 32 through a single shot multivibrator 124 to a logical OR 125. This OR is connected through an inverter 126 to the input of the logical OR 97. Therefore, when the level detector 32 furnishes an output indicating that the output of the differential amplifier is greater than plus 2 volts, a pulse is developed by the single shot multivibrator 124, and, when this pulse drops off, there is an input available at the step switch to move it from its "0" condition to its "1" condition. When the step switch is in its "1" condition, no gate is available to operate clamp 115, so that all of the resistors 37–39 are operative in the circuit, and the maximum amount of voltage is fed back from the output of the amplifier to its input. The gain is therefore clamped down to 1, appropriate to the faster increase in voltage from the ladder converter 28 to the input of the differential amplifier. Thereby, saturation of the amplifier is avoided.

If at any time during counting at the 100 volts per second rate, the level detector 32 has its output drop to "0," indicating that less than plus 2 volts is available at the output of the differential amplifier, then it is necessary to stop counting at 100 volts per second and to increase the gain of the differential amplifier. This is accomplished partly through the development of the count 10 volts per second gate whose generation will be described hereinafter in connection with the slope analyzer of FIG. 5. However, the step switch is controlled by the output of the level detector 32 which, in addition to being connected to the single shot multivibrator 124, is also connected through an inverter 127 to a single shot multivibrator 128. The output of this multivibrator is also connected to the logical OR 125, as well as to one input of a logical AND 130. The other input to this AND 130 is the DOWN gate, indicating that a voltage greater than minus 0.8 volt in the negative direction is available at the output of the differential amplifier 25. The output of the logical AND 130 is connected to the single shot multivibrator 106 which, as indicated above, is connected to one input of the logical AND 105 whose output is connected to the NOR 101 which in turn is connected to the input of the decade counter 46. The output of the single shot 106 is also connected to one input of a logical AND 131. The other input to that AND is the UP gate from the level detector 33, indicating that a voltage greater than 0.8 volt in the positive direction is available at the output of the differential amplifier. The output of AND 131 is supplied to a single shot multivibrator 132 whose output in turn is connected to the logical OR 97, to control the position of the step switch 96.

As a result of all of these connections, when the plus 2 volts gate from the output of level detector 32 drops off, indicating that the output voltage of the differential amplifier is less than plus 2 volts, the single shot multivibrator 128 develops a pulse which is supplied through logical OR 125 to the inverter 126. The output of the inverter therefore drops off, triggering the step switch and moving it to its "2" position. In the "2" position of the step switch, plus 10 volts is delivered to clamp 117, thereby connecting the junction between resistors 38 and 39 to ground and reducing the feedback. The gain may thereby be increased to, say, 10. The further operation of the step switch to return it to its "0" position will be described hereinafter in connection with the "nulling" of the acceleration voltage. Suffice it to say at this point that the step switch is normally in its "0" position when the relay 23 connects the peak voltage to the differential amplifier.

It will be apparent from the above that the decade counters 45–48 count as long as the peak voltage is increasing, to supply an offset voltage from the ladder converter 28. When, however, the peak voltage stops increasing and reaches a stable level, between preselected limits such as plus 0.8 volt and minus 0.8 volt, defining a "deadband," a peak of the ion current is indicated. The apparatus of FIG. 5 is designed to indicate this peak and identify what kind of a peak it is.

Referring to FIG. 5A, the slope analyzer therein indicated includes logical AND's 140 and 141 which are respectively supplied with the UP and DOWN gates. The other inputs to the AND's are derived from a slope enable latch 142 which is controlled by a peak latch 143. The peak latch 143 is in turn controlled by one of two gates, the first gate being the MONITOR PEAK gate which is obtained from the same source as the one which controls latching relay 23, and the other gate being the MONITOR MASS gate which is also obtained from circuitry to be described hereinafter. When the MONITOR PEAK gate is up, an output voltage is supplied from the peak latch 143 to a single shot multivibrator 144. The output of that multivibrator is connected through an inverter 145 to another single shot multivibrator 146.

The output of multivibrator 146 is directed to the "1" input of the slope enable latch 142, and when the latch is in the "1" condition, an output is supplied to both of the logical AND's 140 and 141. The single shot multivibrators and the inverter provide for a delay such that when the MONITOR PEAK gate first comes up, the resultant pulse from single shot 144 is ineffective to operate or trigger the single shot 146, but when the pulse from 144 decays, single shot 146 is triggered to place the slope enable latch in its "1" condition. Then there will be an output at one of the logical AND's 140 and 141 if either the UP or DOWN gate is up. The outputs of these two AND's are directed to single shot multivibrators which preferably supply very short pulses of the order of, say, 20 microseconds. The output of single shot 147 is directed to one input of a logical AND 149, while the output of single shot 148 is directed to one input of a logical AND 150. The other inputs to the AND's 149 and 150 are obtained from the zero volt level detector 35. When the voltage is above "0" volt, there is an output at the second input to logical AND 150. The output of the "0" volt level detector is also connected through an inverter 151 to the logical AND 149, so that, when the voltage is not greater in the positive direction than "0" volt, there is an input at the second input of logical AND 149. The outputs of logical AND's 140 and 150 are respectively connected to counters 152 and 153, each of these counters being effective to supply an output only when two successive inputs have been supplied thereto. Reset voltages are supplied to the respective counters by the opposite AND's. That is, AND 150 supplies a reset voltage to counter 152, while AND 149 supplies a reset voltage to counter 153.

The outputs of counters 152 and 153 are connected to a logical OR 154 which supplies a MOVING PEAK pulse. Also, the output of counter 152 is connected to the "1" input of the slope sign latch 155, while the output of counter 153 is connected to the "0" input of the same latch. The "1" output of latch 155 is the PLUS SLOPE gate, while the "0" output is the MINUS SLOPE gate. As indicated in FIG. 5A, the MOVING PEAK pulse from OR 154 may provide energizing voltage to a lamp 156, while the "1" output of the slope sign latch 155 may supply energizing voltage to a lamp 157 and the "0" output may supply energizing voltage to lamp 158.

In operation of the portion of the slope analyzer so far described, when the peak voltage goes out of the so-called "deadband" between minus 0.8 volt and plus 0.8 volt, assuming that it increases, the UP gate will be available at the input of logical AND 140. With the MONITOR PEAK gate up, there will be an output from the slope enable latch 142 and the single shot 147 will therefore develop a short pulse. Of course, the bi-directional counter will advance at this time to supply a larger analog voltage from the ladder converter to the input of the differential amplifier. If the voltage so supplied is large enough, the output voltage of the amplifier will decrease to below zero volts. There will therefore be an output from the inverter 151, and, since the pulse from the single shot 147 will still be up, the AND 149 will deliver a pulse to the counter 152. When this procedure occurs twice in a row, a MOVING PEAK pulse will be developed by the OR 154, and the PLUS SLOPE gate will be available from the plus slope latch 155.

If the peak voltage should decrease in going out of the "deadband," and the DOWN gate be followed twice by the zero volt trigger, the MOVING PEAK pulse will again be developed, but the slope sign latch will indicate a MINUS SLOPE.

The MONITOR PEAK gate supplied to the peak latch 143 is also supplied to a logical AND 160. The 10 kcs. per second clock pulse is also supplied to the second input of that AND. The output of AND 160 is directed to to one input of another AND 161 which is supplied with the 100 VOLTS PER SECOND gate and with a third gate which is developed from the UP and the DOWN gates. This third input is obtained from a logical AND 162. One input to AND 162 is obtained from a logical OR 163 through an inverter 164. The OR 163 is supplied with each of the UP and DOWN gates. The other input to AND 162 is the MOVING PEAK gate obtained from a latch 165 whose 1 input is supplied with the MOVING PEAK pulse from the OR 154. As a result, when neither the UP nor the DOWN gate is up, and the MOVING PEAK gate is available from latch 165, with the 100 VOLTS PER SECOND gate available at logical AND 161, the MONITOR PEAK gate up, there will be an output from logical AND 161 for each 10 kcs. pulse. The output of this AND is supplied to the input of a decade counter 166. This counter is generally of the type used in the bi-directional counter of FIG. 2, but it is of course not bi-directional. The counter supplies its "1," "2," "4," and "8" gates to a logical AND 167. This AND is also supplied with a pulse from a single shot multivibrator 168 which is driven by the output of logical OR 163. As a result of these connections, when the decade counter 166 is advanced to its "1" position and either the UP or the DOWN gate comes up, a voltage is available at the output of the AND 167. This voltage is directed to the "1" input of a noise latch 350 whose output is conected to a noise lamp 169. These connections are provided in order that it may be indicated that the peak which caused only one count of the counter 166 must necessarily be a noise peak, because the usual output of a mass spectrometer does not increase this rapidly.

If the UP or DOWN pulse from single shot multivibrator 168 does not occur following the first count of the counter 166, the counter continues to advance without actuation of the noise latch. If the counter counts beyond 10 counts of 10 kcs., the output of the counter supplies a pulse to a logical OR 170. This OR supplies an input to a second counter 171, to drive that counter in the same fashion as the counter 166 is driven. The "1," "2," "4," and "8" outputs of the counter 171 are directed to a logical OR 172. The "1" output also forms the COUNT 10 VOLTS PER SECOND pulse which is used in connection with the bi-directional counter to remove the bypass from the first counting stage 45. Consequently, after 10 counts of 10 kcs. pulses during which 10 millivolts are added to the output voltage from the ladder converter for each pulse, the COUNT 10 VOLTS PER SECOND pulse comes up to start counting at 1 millivolt per 10 kcs. pulse.

The output of the logical OR 172 is connected to one input of the logical AND 173. This AND is also supplied with the output of single shot multivibrator 168, so that, when the decade counter 171 is in any one of its "1," "2," "4," and "8" positions, and there is either an UP or a DOWN gate, an actuating voltage is available at the output of logical AND 173. This voltaage is directed to the "1" input of peak latch 174 whose "1" output is supplied to a peak lamp 175. The output of AND 173 is also connected to the "0" input of noise latch 350 to turn off the latch at that time. The peak latch 174 also receives at its "0" input the output of a logical OR 176 whose inputs include the "1" input to the noise latch 350. Therefore, the noise latch is off when the peak latch is on, and the peak latch is off when the noise latch is on.

Another input to the logical OR 170 whose output drives the decade counter 171, is obtained from a logical AND 180. One input to this AND is the 10 VOLTS PER SECOND gate obtained from the "1" output of the counter 171. Another input is the output of the logical AND 162 which indicates the coincidence of a MOVING PEAK gate and the presence of neither of the UP and DOWN gates. The third input to the AND 180 is the coincidence of the 10 kcs. pulses and the MONITOR PEAK gate obtained from the logical AND 160. Therefore, when the ladder converter and bi-directional counter combination is operating at 10 volts per second, and the output of the differential amplifier is in the deadband, each 10 kcs. pulse advances the decade counter 171.

The output of decade counter 171 is connected to a further decade counter 182. The "1," "2," "4," and "8" outputs of this counter are connected to a logical OR 183 whose output forms one input to a logical AND 184. The other input to the AND 184 is derived from the single shot multivibrator 168. The output of AND 184 is supplied to a binary counter 185 whose output is directed to a logical AND 186. The other input to the logical AND 186 is the MOVING PEAK gate obtained from the output of a latch 187 to which the MOVING PEAK pulse from logical OR 154 is supplied. The output of AND 186 is the READ PEAK gate which performs functions to be described shortly.

With the connections of the counters 166, 171, and 182 so far described, the counters operate as units, tens, and hundreds counters to count the number of 10 kcs. pulses which occur during the time that the difference voltage is in the deadband between plus 0.8 volt and minus 0.8 volt. When this time is greater than 20 counts of the 10 kcs. pulses, and the bi-directional counters are counting at the rate of 10 volts per second, and when such count is repeated twice before either an UP or a DOWN gate occurs, a READ PEAK gate is developed. This gate is indicative that the peak which is to be read or indicated has occurred, since the peak voltage has by that time levelled off.

The READ PEAK gate is directed to the "0" input of the latch 165 to reset that latch and remove the MOVING PEAK gate. Also, the gate is directed to a 50 microsecond delay network 351 whose output forms one input for a logical AND 188. The other input to the AND 188 is obtained from an inverter 189 whose input is the output of single shot 146 in the slope enable latch circuit. Since that single shot supplies only for a short time shortly after the MONITOR PEAK gate first comes up, no voltage is available at the input of inverter 189 and a voltage is available at its output. The output of AND 188 is directed to a buffer 190 which supplies the MONITOR MASS gate to the peak latch 143 and also supplies it to the latching relay 23 to change the relay to monitor the mass input of the mass spectrometer.

The apparatus of FIG. 5A also includes a provision for the turnoff of the MOVING PEAK gate and the READ PEAK gate in the event that the counters 166, 171 and 182 count an excessive number of 10 kcs. pulses during the residence of the difference voltage in the deadband between plus 0.8 volt and minus 0.8 volt. In order that this may be accomplished, the output of the decade counter 182 is connected to the latch 187 to change the latch to its "0" condition when the maximum count of the several counters is reached. Also, the "0" output of the latch 187 is directed to the logical OR 176 and through that OR to the "0" input of the peak latch 174 to turn off the peak light in the event that it is on.

When the READ PEAK gate is developed in the slope analyzer circuit of FIG. 5A, it is indicated that the peak voltage supplied by the ion current of the mass spectrometer has reached a peak. This READ PEAK gate is supplied, in FIG. 1, to a logical AND 200 to which are also supplied the various gates developed by the decade counters 45–48 of the bi-directional counter of FIG. 2. That is, for each of these counters, there is a 1, $\bar{1}$, 2, $\bar{2}$, 4, $\bar{4}$, 8 and $\bar{8}$ output and these outputs are directed through the AND 200 (schematically shown as a single AND, though obviously a complex gate circuit would be used) to a peak register 201. The reading of the decade counters at this instant will therefore be stored in the peak register for later indication. The peak register obviously may be of a conventional type well known in the art.

Referring to FIG. 2, when the MONITOR MASS gate is developed and the relay 23 is switched so that the accelerating voltage is furnished to the differential amplifier, since the accelerating voltage will normally be much greater than the peak voltage, there will be a considerable unbalance available at the output of the differential amplifier. The plus 2 volts actuating voltage will therefore be available at the output of the level detector 32 (FIG. 1) so that the single shot multivibrator 124 will be keyed to furnish a short pulse to the inverter 126. The step switch is stepped to its "1" position at the end of this pulse from the multivibrator 124. As above described, clamp 115 is then released, decreasing the amplifier gain to 1. In the "1" position of the step switch, a gate is developed which is furnished to one input of a logical AND 205. The other input to this AND is obtained from the output of logical AND 90 which receives the 10 kcs. pulses when either the UP or the DOWN gate is on. The output of AND 205 is directed to the NOR 109 which controls an input of the decade counter 48. Therefore, with the step switch 96 in the "1" condition, and the UP gate on, the decade counter 48 is advanced by one count for each 10 kcs. pulse. This, of course, instructs the ladder converter 28 to increase the output of the converter by one volt for each count from the 10 kcs. clock. During this counting, if at any time the output of the ladder converter is larger than the accelerating voltage furnished to the differential amplifier, the plus 2 volts actuating voltage disappears, and the single shot multivibrator 128 is triggered to develop a pulse and furnish it to the inverter 126 and to the logical AND 130. Since a DOWN gate will be available at this time, because of the excess output of the ladder converter, the single shot multivibrator 106 is triggered to develop an input to a logical AND 206 whose other input is obtained from the "1" output of the step switch 96. The output of the logical AND 206 is supplied to the NOR 109 and, at the end of the pulse from the single shot 106, the output of NOR 109 pulses the counter 48. With the DOWN gate available at counter 48 at this time, the counter counts backwards by one count to subtract the excess count from the output of the counter and therefore to decrease the analog voltage from the converter 28 by one volt.

When the plus 2 volts actuating voltage drops off, the output of inverter 127 increases to trigger single shot 128. When the pulse from that source drops off, the output of inverter 126 increases to advance the step switch 96 to its "2" position. The "2" output of the step switch is connected to clamp 117 to cause that clamp to connect the junction between resistors 38 and 39 to ground. The gain of the amplifier is thereby increased to, say 10 since the analog output of converter 28 is now to be increased at the rate of 100 millivolts for each 10 kcs. pulse. The "2" output of the step switch is also supplied to a logical AND 210 whose other input is obtained from the logical AND 90. As indicated above, AND 90 supplies an output when either the UP or the DOWN gate is on and a 10 kcs. pulse becomes available. The output of AND 210 is supplied to the NOR 107 whose output is in turn connected to the input of the decade counter 47. As a result of these connections, when the step switch is in position "2," and the UP gate is on, the decade counter 47 is advanced by one count for each 10 kcs. pulse, thereby advancing the output of the ladder converter by 100 millivolts for each 10 kcs. pulse. This counting upwardly continues until the output of the ladder converter exceeds the accelerating voltage, whereupon the DOWN gate becomes available again and the plus 2 volts actuating voltage drops off. A pulse from single shot 106 is then supplied to the NOR 107 by a logical AND 211 whose inputs are obtained from the "2" output of the step switch 96 and the output of the single shot multivibrator 106. Thereby, the last count is subtracted from the decade counter 47, thus reducing the ladder converter voltage so that there is once more an excess of the accelerating voltage over the analog voltage from the converter. Then the step switch is advanced to its "3" position.

In its "3" position, the step switch supplies an output through the logical OR 103 to the clamp 116 to connect the junction between resistors 37 and 38 to ground. Thereby, only the voltage available across resistor 37 is fed back to the input of the differential amplifier and the gain increases to, say, 100. The "3" output of the step switch is also supplied to logical AND 105, along with the output of the single shot multivibrator 106, and it is supplied through the logical OR 103 and the logical AND 102 to the NOR 101. Since these connections have been described in detail hereinabove, the connections will not be further described, and it will be apparent that the decade counter 46 will count upwardly with each 10 kcs. pulse to increase the analog voltage from the converter 28 by 10 millivolts for each pulse.

Counting of the decade counter 46 and the resultant increase at 10 millivolts per 10 kcs. pulse will continue until the output of the ladder converter exceeds the accelerating voltage, whereupon the last count will be subtracted from the counter, thereby decreasing the ladder converter voltage by 10 millivolts. Then, the step switch is advanced to its "0" position, causing operation of clamp 115 to return the amplifier gain to maximum. Counting will then proceed at 10 volts per second through keying of the decade counter 45 in the manner indicated above to increase the ladder converter voltage by one millivolt for each 10 kcs. pulse, until the accelerating voltage is matched by the converter voltage.

When the null condition is reached, a decade counter 220 in the slope analyzer (FIG. 2) is operated to set up a further sequence of events to indicate the mass number. The decade counter is controlled by a logical AND 221 which receives the 10 kcs. clock pulses, and the MONITOR MASS gate. The AND also receives the inverse of the UP and DOWN gates through inverters 222 and 223, respectively. Therefore, when the output of the amplifier 25 is in the deadband between the plus 0.8 volt and minus 0.8 volt, during the monitor mass condition of the apparatus, each 10 kcs. pulse advances the decade counter 220 by one count. The sixth output of the decade counter is a READ MASS gate which is directed (FIG. 1) to a logical AND 225 which also receives the several outputs of the bi-directional counter unit 40, in the same manner as does logical AND 200. The counter outputs are then gated in to the register of a divider 226.

The decade counter 220 continues to count upwardly and, when it reaches the "8" condition, a RE-ENTER PEAK INHIBIT gate is developed. This gate lasts through the 9 count of the counter 220 and is supplied (FIGS. 1 and 3) to the gate matrix 41. As indicated above, the gate is connected to an inverter 58 which supplies its output to the various AND's of the gate matrix. Therefore, when the RE-ENTER PEAK INHIBIT gate is up, any count in the decade counters 45-48 (FIG. 2) cannot be transferred to the ladder converter 28. The RE-ENTER PEAK INHIBIT gate is also connected to the decade counters 45-48 to reset them to zero.

When the decade counter 220 (FIG. 2) reaches its "9" count a RE-ENTER PEAK gate is developed. That gate is supplied (FIG. 1) to a logical AND 230 to which is also connected the output of the peak register 201. It will be recalled that the output of the bi-directional counter 40 was stored in the PEAK REGISTER at the end of the peak voltage conversion operation. This peak voltage equivalent is therefore transferred back to the bi-directional counter at the time that the decade counter 220 reaches its "9" count. Then, when the counter reaches the 10th count, with the next 10 kcs. pulse, the RE-ENTER PEAK INHIBIT gate drops off, and the ladder converter is directed to develop the voltage corresponding to the peak voltage which has been re-entered in the bi-directional counter 40. Simultaneously, a MONITOR PEAK gate is developed to transfer the latching relay 23 (FIG. 1) to the position shown in the drawing, connecting the peak voltage to the input of the differential amplifier. The apparatus is then ready once more to monitor the peak voltage, but additional operations to those described above take place during this monitoring operation. These further operations will be described in connection with FIG. 5B showing another portion of the slope analyzer.

Referring first to FIG. 5A, when the MONITOR PEAK gate comes up, the peak latch 143 is operated, as described above. The resultant gate generates a pulse in the single shot multivibrator 144 and after a delay determined by the length of that pulse, the single shot multivibrator 146 is triggered. The output pulse from the multivibrator 146 is an INDICATE TYPE OF PEAK gate which is supplied to the apparatus of FIG. 5B. Before it is described how this gate is employed in the apparatus, the description must first go back in time to the initial development of the READ PEAK gate. Referring to FIG. 5A, it will be recalled that the READ PEAK gate is developed when there is a MOVING PEAK gate and when the counters 166, 171, and 182 have developed at least 20 counts of 10 kcs. pulses at the rate of 10 volts per second. The READ PEAK gate was described above in its utilization to develop the MONITOR MASS to change the latching relay so that the differential amplifier was supplied with the accelerating voltage. However, it will be noted that the delay network 351 furnishes a 50 microseconds delay before this MONITOR MASS gate comes up. In this interval, the READ PEAK gate is employed to set certain latches to be described hereinafter. Referring to FIG. 5B, the READ PEAK gate is supplied to a logical AND 250 to which is also supplied the MINUS SLOPE gate from the slope sign latch 155 of FIG. 5A. The output of the AND 250 is supplied to latches 251 and 252 to set these latches to their "1" condition. The READ PEAK gate is also supplied to another logical AND 253 to which is supplied also the PLUS SLOPE gate from the slope sign latch 155. The output of AND 253 sets latches 254 and 255 to the "1" condition.

It was indicated above that the READ PEAK gate resets the latch 165 of FIG. 5A, so that the MOVING PEAK gate disappears. Therefore, the READ PEAK gate drops off, but the latches 251, 252, 254, and 255 remain in the conditions to which they were set during READ PEAK time.

Now, when the INDICATE TYPE OF PEAK comes up, it is delivered to a set of logical AND's 256–259. The "1" outputs of latches 251, 252, 254 and 255 are also delivered to the respective AND's 256–259. The PLUS SLOPE gate is also delivered to the AND's 256 and 259 and the MINUS SCOPE gate is delivered to AND's 257 and 258. As a result, in this new MONITOR PEAK operation, one of the AND's 256–259 will furnish an output, depending upon the past history and new slope of the peak voltage.

The outputs of AND's 256–259 are respectively delivered to single shot multivibrators 260–263. The output of single shot 260 is delivered to a logical OR 264 which supplies an INDICATE VALLEY LEVEL gate which is used to energize an appropriate lamp. It will be seen that this gate is developed when the slope changes from minus to plus.

The output of single shot 260 is also delivered to an inverter 265 whose output is in turn delivered to a single shot multivibrator 266. The pulse output from the single shot 266 is delivered to the "0" input of the latch 251 to reset the latch a short time after the development of the INDICATE VALLEY LEVEL gate.

The outputs of single shots 261–263 are delivered to a logical OR 267 which develops the INDICATE PEAK gate, so that a peak is indicated except when a minus slope is followed by a plus slope.

The output of single shot 262 supplies an INDICATE SIDE PEAK gate, indicating a negative slope which continues negative after a peak is indicated. The output of single shot 263 furnishes an INDICATE RINSING SIDE PEAK gate, indicating a positive slope which continues positive after a peak is indicated.

The latches 252, 254 and 255 are all supplied with reset systems similar to that for latch 251 and those reset networks will not be described more fully, since the operation of the necessary circuits is evident from the showing in the drawings.

The slope analyzer apparatus further includes a logical AND 275 which is supplied with certain outputs of the decade counters 45–48 of FIG. 2. For instance, the 1 output of thousands counter 48, the 1 output of hundreds counter 47, and the 1 output of tens counter 46 are supplied to AND 275, together with the "1" output of the units counter 45. The output of the AND 275 is supplied to the "1" input of a latch 276 which supplies voltage to the logical OR 264. A re-set gate is provided for the latch from the 2 volt level detector 32. The gate available at the "1" output side of latch 276 therefore indicates that the signal voltage input to the differential amplifier is between one and two volts. As indicated, this gate through OR 264 provides an INDICATE VALLEY LEVEL gate. The gate is also supplied to a logical AND 277 which is further supplied with the MINUS SLOPE gate and the minus 4 volts actuating voltage from level detector 31 of FIG. 1. The output of AND 277 is supplied to the "1" input side of a latch 278 to turn that latch to the "1" position. The "1" output side of latch 278 is connected to the "1" input side of a further latch 279 whose "1" output is supplied to a logical AND 280. Another input to AND 280 is supplied from the output of OR 267, this being the INDICATE PEAK gate. The output of AND 280 is an INDICATE OVERSHOOT gate. The INDICATE OVERSHOOT gate is therefore developed whenever the bi-directional counter is set between 1 volt and 2 volts and the difference voltage is more than 4 volts negative. The latch 279 is provided with an appropriate reset circuit similar to those above described. In addition, the latch 278 is supplied at its "0" input with the UP gate, so that the latch is re-set when the output of the differential amplifier goes above plus 0.8 volt.

The output of latch 276 is supplied to an inverter 281 whose output in turn is supplied to a logical AND 282. The AND 282 is also supplied with the output of the counter 182 of FIG. 5A, the 999 overflow gate, indicating that the peak voltage has remained in the dead band for at least 999 counts of the 10 kcs. pulses. The output of AND 282 is supplied to a latch 283 whose output is in turn supplied to a logical AND 284. The AND 284 is supplied with a MOVING PEAK gate developed from the latch 165 of FIG. 5A, and the output of the AND is an INDICATE METASTABLE PEAK gate. Therefore, when the signal voltage input to the differential amplifier is at least as high as 10 millivolts, and the outputs of the decade counters 166, 171, and 182 are over 999, and the MOVING PEAK gate is available, a metastable peak is indicated.

Summarizing the operation of the circuits of FIG. 5B, when a negative slope at read peak time is followed by a negative slope at indicate type of peak time, the time after which the previous reading is re-entered into the bi-directional counter unit, a side peak is indicated. When a positive slope of the peak voltage at read peak time is followed by a positive slope at indicate type of peak time, a rising side peak is indicated. When the signal voltage is at least as high as 10 millivolts, the slope at read peak time was negative, and the minus 4 volts level detector is operated, an overshoot is indicated. When a negative slope at read peak time is followed by a positive slope at indicate type of peak time, a valley level is indicated. Also, a metastable peak is indicated when the count gets up to over 999 in the decade counters of the slope analyzer, and the input voltage is at least as high as 10 millivolts. Each of these "indicate" gates may be used to energize an appropriate indicator, such as a lamp.

Referring now back to FIG. 1, the INDICATE PEAK gate which was developed from the logical OR 267 of FIG. 5B is shown as being supplied to a readout oscillator and ring counter 290. This apparatus is of conventional form designed to develop sequential gates which operate the various readout circuits connected to the peak register 201 and the divider 226. Referring first to indication of the ion current peak, the output of the peak register is gated sequentially into the binary to digital converter 291 by the gates from the readout oscillator and ring counter 290. The converter 291 obviously converts the resultant voltages into digital form to operate an appropriate indicator 292 which may be both a lamp indicator and such types of indicator as a paper punch or a paper printout. Simultaneous readout of the mass number is obtained by connection of the readout oscillator and ring counter to a gate 293 which is supplied with the output from the divider 226. The divider may be of conventional form and operates to multiply the acceleration voltage by the constant 1 divided by $KB^2$, and then to take the reciprocal of the resultant. The gate 293 operates to gate the resultant voltage into a binary to digital converter 294, under the control of the ring counter 290, and the output of the converter 294 is supplied to an indicator 295 which may be both a panel lamp indicator and either a paper punch or a paper readout. The indicator systems shown in block form in connection with both the peak indication and the mass number indication are not important in themselves to the present invention. That is, they may be of conventional form and their operation will be apparent.

In operation of the entire apparatus of FIGS. 1–5, when the apparatus is first turned on, a MONITOR PEAK gate is available from the slope analyzer to latch the relay 23 in the monitor peak position. The output voltage from the mass spectrometer corresponding to its ion current is therefore supplied to the differential amplifier 25. The bi-directional counter 40 then operates under control of the level detectors 30–35 to control the ladder converter 28 to develop an analog voltage which is equal to the peak voltage. The differential amplifier then goes into a dead band between plus 0.8 volt and minus 0.8 volt, whereupon the slope analyzer operates to determine how long and how often the peak remains in this dead band. If the peak remains twice in the deadband for 20 counts of 10 kcs. pulses, when the apparatus is counting at the rate of 10 volts per second, a valid peak is indicated, and the output of the bi-directional counter unit is gated into the peak register 201. Then, the latching relay 23 is shifted to its other position to monitor the accelerating voltage, and the bi-directional counter again builds up an equivalent analog voltage from the ladder converter 28. Since, in the illustrated circuit, the same counter is used for both the accelerating voltage and the peak voltage, and since the accelerating voltage is usually much higher than the peak voltage, a high speed conversion is provided for in the bi-directional counter when it is operating to buck out the accelerating voltage with the analog voltage. When the differential amplifier is again in the deadband, indicating that the analog voltage from the ladder converter 28 is equal to the accelerating voltage at the input of the differential amplifier, the output of the counter is gated into the divider 226 and the counter is reset to zero. Then, the latching relay is reset to the peak voltage condition, the peak register stored count is re-gated back into the bi-directional counter, and the direction of movement of the peak voltage is tested to determine whether it is in the same or a different direction as the previous direction of the slope of the peak voltage. This allows the various kinds of peaks to be indicated, and then an INDICATE PEAK gate is developed from the slope analyzer to operate the readout oscillator and ring counter 290 to perform the readout operation on both the peak voltage and the accelerating voltage, so that the relative levels of ion current and the mass number are indicated.

FIG. 7 shows some of the various types of peaks which may be identified with the apparatus disclosed above. The first peak 300 is a rising side peak in which the distance between the letters A and B may be of the order of, say, 30 milliseconds, corresponding to 300 pulses from the clock oscillator. The peak 301 is a true maximum, indicated only by the INDICATE PEAK gate and the "deadband" CD may be seen to be of the same interval as the interval AB. The peak 302 is of course an overshoot peak, while numeral 303 identifies a metastable peak. A noise peak is also indicated at 304.

The various peaks shown in FIG. 7 are all identified by the apparatus of FIGS. 1–5. That apparatus detects a valid peak (as distinguished from a noise or a metastable peak) by responding to the decrease in slope of the signal voltage at the onset of the peak, which decrease causes the slope analyzer to register a plurality of successive deadbands each lasting between predetermined limits (in the illustrated embodiment, 10–999 counts of 10 kcs. pulses while counting at a 10 volts per second rate, or 1–99 milliseconds).

It is also possible to detect a valid peak by detecting the width of the deadband, that is, the width of the top of the peak. Thus, referring to peak 301 of FIG. 7, if a counter is turned on at time C and turned off at time D, and if the counter registers, say, 10–100 milliseconds, a valid peak may be indicated. Apparatus providing for this method of peak detection is shown in FIG. 6.

The apparatus of FIG. 6 replaces the portion of the slope analyzer of FIG. 5 enclosed by the dashed lines of FIG. 5A, that is, the logical OR 183, the AND 184, the binary counter 185 and the AND 186. The "1," "2," "4" and "8" outputs of decade counter 182 are supplied to a logical OR 310 whose output is connected to an AND 311.

The other input to AND 311 is obtained from single shot multivibrator 168 which provides a pulse whenever either the UP or DOWN actuating voltage becomes available. The output of AND 311 is supplied to the "1" input of a latch 312, so that the latch is turned "on" when the difference voltage from amplifier 25 remains in the deadband for 10–99 counts of the 10 kcs. clock before the difference voltage goes out of the deadband. This indicates the onset of the peak.

The "1" output of latch 312 is supplied to an AND 313 which also receives the 10 kcs. clock pulses, and the output of this AND is delivered to the first one of a set of three cascade-connected decade counters 314–316. The "1," "2," "4" and "8" outputs of the third counter 316, which come up whenever the count is between 100 and 999, are supplied to an OR 317 which supplies its output to an AND 318. Another input to AND 318 is obtained through an inverter 319 from the "1" output of a latch 320 whose "1" input is connected to the output of counter 316. Thus, there is an output from inverter 319 except when the counter 314–316 registers over 999 counts.

The third input to AND 318 is obtained from the single shot 168, and the output of the AND is the READ PEAK gate which indicates a valid peak and performs the various operations described above. Thus, if the counter registers between 100 and 1000 pulses (10–100 milliseconds) before the difference voltage goes out of the deadband, a valid peak is indicated.

Reset of the latch 312 to turn off the counter is accomplished by various conditions. The MINUS SLOPE and PLUS SLOPE gates from slope sign latch 155 (FIG. 5A) are supplied to AND's 325 and 326, respectively. These AND's are also supplied with the output of AND 311. The output of AND 325 is supplied to the "1" input of a latch 327, while the output of AND 326 is supplied to the corresponding input of latch 328. The "1" outputs of these latches are connected to AND's 329 and 330, respectively. These AND's also respectively receive the UP and DOWN gates and their outputs are supplied to an OR 331. The output of that OR is connected to the "0" input of latch 312.

Thus, when the counter 314–316 is turned on, either of latches 327 and 328 is turned on, depending upon whether the previous slope of the signal voltage has been negative or positive. Then, when the signal voltage next leaves the deadband, the counter control latch 312 will be turned off if the slope changes sign.

The OR 331 is also supplied with the 100 VOLTS PER SECOND gate from slope rate latch 95 (FIG. 2) to end the counting period when the magnitude of slope increases to a great extent. Also, to reset the latch in the event the signal does not remain in the deadband for the required time interval, the OR 331 is supplied with the output of an AND 335. One input to that AND is obtained from single shot 168, while another input is obtained from an OR 336 to which are supplied the "1," "2," "4" and "8" outputs of counters 314 and 315. The third input to AND 335 is the "1" output of a latch 337 whose "1" input is obtained from AND 311. The "0" input to the latch is obtained from the output of counter 315.

As a result of these connections, if the signal voltage remains in the deadband for less than 100 counts after the onset of a peak is indicated, the latch 312 is turned off. The "0" output of the latch is supplied to a single shot 340 which provides a pulse to reset each of the latches 327 and 328. That pulse is also supplied to a delay network 341 which supplies a delayed pulse to reset counters 314–316 and latch 320.

The operation of the peak-sensing apparatus of FIG. 6 has been described in connection with the description of its components and so need not be repeated.

It will be apparent that many other modifications of the illustrated apparatus than the changed scheme of peak analysis could be made without departure from the scope of the invention. The invention is therefore to be measured only by the scope of the appended claims.

I claim:

1. Apparatus for analysis of a variable signal voltage to indicate the occurrence of peaks therein comprising first means operable to compare a pair of input signals and to supply one output when the difference therebetween is greater in the positive sense than a first predetermined level and another output when the difference therebetween is greater in the negative sense than a second predetermined level, said predetermined levels defining a deadband centered at about zero difference, the signal and a reference signal forming the two input signals to said first means, second means operable to supply said reference signal in periodically increasing level as long as said one output is available from said first means and in periodically decreasing level as long as said other output is available from said first means, and third means connected to said first means and operable only when said difference remains in said deadband for at least a predetermined time period to provide an indication of a peak in said signal voltage.

2. The apparatus of claim 1 in which said third means is operative to provide said indication only after said difference has remained in said deadband for said time period a plurality of consecutive times.

3. The apparatus of claim 1 in which said third means is operative to provide said indication only after said difference has remained in said deadband for said time period and said signal changes its slope in a predetermined manner.

4. The apparatus of claim 3 in which said predetermined manner is one of a change in sense and a change in amplitude beyond a predetermined level.

5. The apparatus of claim 1 in which said first means comprises a differential amplifier operable to furnish an output voltage proportional to the difference between the signal and said reference signal and a pair of level detectors each operable to furnish an output when its input is larger than a predetermined level, the output signal of said amplifier being supplied to both of said level detectors.

6. Apparatus for analysis of a variable signal voltage to indicate the occurrence of peaks therein comprising first means operable to compare a pair of input voltages and to supply one output when the difference therebetween is above a first predetermined level and another output when that difference is below a second predetermined level, said predetermined levels defining a deadband centered at about zero volts, the signal voltage forming one input to said first means, second means operable to supply a reference voltage which periodically increases as long as said one output is available and which periodically decreases as long as said other output is available from said first means, said reference voltage being supplied to said first means to form the other input voltage thereto, a source of periodic pulses of voltage, a counter supplied with said pulses only when neither of said outputs is available from said first means and operable to count such pulses, and third means, responsive to said counter registering a number of counts between predetermined limits before one of said outputs becomes available from said first means, operable to provide an indication of a peak in said signal voltage.

7. The apparatus of claim 6 in which said second means includes a digital to analog converter operable to supply an analog voltage of magnitude corresponding to a digital input as said reference voltage, a bi-directional counter supplied with both outputs of said first means and supplied with said pulses whenever either one of said outputs is available and operable to count said pulses in the sense determined by which one of said outputs is available from said first means, the digital output of said counter being supplied to said converter, and fourth means connected to said bi-directional counter operable to indicate its count after a peak in said signal voltage has been indicated.

8. The apparatus of claim 7 in which said bi-directional counter includes a plurality of cascade-connected decade counters, and said digital to analog converter includes a corresponding plurality of converter networks, the decade counters being so connected to the converter networks and the networks being so constructed and arranged that when said pulses are supplied to the first decade counter the output of the converter changes in $n$ volt steps with each pulse and when said pulses are supplied directly to the second-connected decade counter the output of the converter changes in $10n$ volt steps with each pulse, where $n$ is a predetermined fixed number, and fifth means responsive to the difference between the voltages supplied to said first means exceeding a predetermined high level for bypassing said first decade counter and supplying said pulses directly to said second decade counter.

9. The apparatus of claim 6 in which said third means includes a second counter connected to said first-mentioned counter and operable to cause such indication only after the difference between the input voltages to said first means has been in said deadband for said number of counts a plurality of times.

10. The apparatus of claim 6 in which said third means includes a second counter, a gate operable when open to supply said pulses to said second counter, fourth means responsive to said first-mentioned counter registering said number of counts before one of said outputs becomes available from said first means and operable thereupon to open said gate, fifth means operable to close said gate when said signal voltage changes its slope in a predetermined manner, and sixth means operable when said second counter registers a count between predetermined limits when said gate is closed to indicate a peak in the signal voltage.

11. The apparatus of claim 10 in which said first means includes a differential amplifier supplied with said signal and reference voltages and operable to furnish a voltage output of amplitude proportional to the difference therebetween and of sign dependent upon which voltage input is the larger, and a pair of level detectors supplied with the output voltage from the differential amplifier and each operable to furnish a voltage output when that voltage exceeds its preset level; a third level detector supplied with the output of said differential amplifier and operable to furnish an actuating voltage output when the output thereof exceeds a third predetermined level much greater than said first and second predetermined levels; and in which said fifth means includes seventh means operable to furnish an actuating voltage whenever the slope of said signal voltage changes sense from that preceeding the opening of said gate to that existing when one of said outputs next becomes available from said first means, and a logical OR supplied with said actuating voltages from said seventh means and said third level detector and operable to furnish a pulse to close said gate when either of said actuating voltages becomes available.

12. The apparatus of claim 6 in which said first means includes a differential amplifier operable to subtract said reference voltage from said signal voltage and to supply an output voltage of amplitude proportional to the difference therebetween and of sense determined by which voltage is the larger, and a pair of level detectors each operable when its preset voltage is exceeded in magnitude to deliver an actuating voltage, the first detector being responsive to a voltage greater than a predetermined positive level and the second detector being responsive to a voltage greater than a predetermined negative level, the output voltage of said amplifier being supplied to each of said level detectors; and, said second means includes a bi-directional counter supplied with the actuating voltages from both said level detectors and operable when the actuating voltage from the first detector is available to increase its count for each periodic voltage pulse supplied thereto and when the actuating voltage from the second detector is available to decrease its count for each periodic voltage pulse supplied thereto, a source of periodic voltage pulses connected to said counter whenever either of said actuating voltages is available, a digital to analog converter connected to said bi-directional counter and operable to supply an analog voltage of amplitude instantaneously corresponding to the count registered therein, said analog voltage being supplied to said differential amplifier to form the reference voltage.

13. The apparatus of claim 12 including means for converting the count stored in said bi-direction counter into a decimal indication when a peak is indicated.

14. The apparatus of claim 6 including means for providing different indications when the slope of said signal voltage changes from positive to negative, changes from negative to positive, and remains of the same sense, after a peak is indicated.

15. For use with an analyzer which provides a first signal voltage corresponding to the relative proportions of each of a plurality of constituents in a material as a second signal voltage is varied, apparatus comprising first means operable to compare a pair of input voltages and to supply a first actuating voltage when the difference therebetween is greater in the positive sense than a first predetermined level and a second actuating voltage when that difference is greater in the negative sense than a second predetermined level, said predetermined levels defining a deadband centered at about zero volts, switch means operable in one position to connect said first signal voltage to said first means and operable in another position to connect said second signal voltage to said first means, a source of periodic voltage pulses, a bi-directional counter operable when supplied with voltage pulses to increase its count when supplied with said first actuating voltage and to decrease its count when supplied with said second actuating voltage, a digital to analog converter connected to said bi-directional counter operable to provide an analog voltage to said first means of amplitude continuously corresponding to the count registered in the counter, means including a second counter supplied with voltage pulses from said source to advance the counter only when neither of said first and second actuating voltages is available and operable when the count registered in the second counter is in a predetermined range when one of said first and second actuating voltages becomes available to provide a third actuating voltage, a register, means operable to gate the count stored in said bi-directional counter into said register when said third actuating voltage becomes available, means operable to change said switch means to its second position when said third actuating voltage becomes available, a third counter operable when it reaches a predetermined count to translate the counts stored in said register and said bi-directional counter into respective decimal indications of the amplitudes of said first and second signal voltages and means responsive to said third actuating voltage to gate said periodic voltage pulses into said third counter when neither of said first and second actuating voltages is available, said third counter being operable to change said switch means into said first position when it reaches a second higher predetermined count.

16. The apparatus of claim 15 in which said bi-directional counter includes a plurality of cascade-connected decade counters and said converter includes a corresponding plurality of converter networks each operable to supply a voltage of amplitude corresponding to the count stored in its corresponding decade counter, and including a third level detector operable to supply a fourth actuating voltage whenever the output voltage of said amplifier is greater in the positive sense than a third predetermined level much higher than said first predetermined level, and means responsive to said fourth actuating voltage for bypassing at least the first one of said decade counters and supplying said periodic pulses directly to the next-connected decade counter.

17. For use with an analyzer which provides a first signal voltage corresponding to the relative proportions of each of a plurality of constituents in a material as a second signal voltage is varied, apparatus comprising first means operable to compare a pair of input voltages and to supply a first actuating voltage when the difference therebetween is greater in the positive sense than a first predetermined level and a second actuating voltage when that difference is greater in the negative sense than a second predetermined level, said predetermined levels defining a deadband centered at about zero volts, a source of periodic voltage pulses, a bi-directional counter operable when supplied with voltage pulses to increase its count when supplied with said first actuating voltage and to decrease its count when supplied with said second actuating voltage, a digital to analog converter connected to said bi-directional counter operable to provide an analog voltage to said first means of amplitude continuously corresponding to the count registered in the counter, means including a second counter supplied with voltage pulses from said source to advance the counter only when neither of said first and second actuating voltages is available and operable when the count registered in the second counter is in a predetermined range when one of said first and second actuating voltages becomes available to provide a third actuating voltage, means connected to said bi-directional counter operable after said third actuating voltage becomes available to provide decimal indications of the count in said bi-directional counter and of the amplitude of said second voltage.

18. For use with an analyzer which provides a first signal voltage corresponding to the relative proportions of each of a plurality of constituents in a material as a second signal voltage is varied, apparatus comprising first means operable to compare a pair of input voltages and to supply one output when the difference therebetween is greater in the positive sense than a first predetermined level and another output when that difference is greater in the negative sense than a second predetermined level, said predetermined levels defining a deadband centered at about zero volts, said first signal voltage and a reference voltage forming the two input voltages to said first means, second means operable to supply said reference voltage in periodically increasing level as long as said one output is available from said first means and in periodically decreasing level as long as said other output is available from said first means, third means connected to said first means and operable when said difference voltage remains in said deadband for a time period between predetermined limits to supply a third actuating voltage indicative of the occurrence of a peak in said first signal voltage, and means for providing a decimal indication of the magnitude of each of said first and second signal voltages after said third actuating voltage becomes available.

References Cited by the Examiner
UNITED STATES PATENTS

| 2,609,501 | 9/1952 | Guthrie | 328—111 |
| 2,845,597 | 7/1958 | Perkins | 324—103 |

WALTER L. CARLSON, *Primary Examiner.*

FREDERICK M. STRADER, *Examiner.*